United States Patent
Kidwell (10) Patent No.: US 12,427,458 B2
(45) Date of Patent: Sep. 30, 2025

(54) PLEATED POLYMERIC SHEET HAVING APERTURES

(71) Applicant: DelStar Technologies, Inc., Middletown, DE (US)

(72) Inventor: James Kidwell, Maple Grove, MN (US)

(73) Assignee: DelStar Technologies, Inc., Alpharetta, GA (US)

( * ) Notice: Subject to any disclaimer, the term of this patent is extended or adjusted under 35 U.S.C. 154(b) by 593 days.

(21) Appl. No.: 17/613,900

(22) PCT Filed: May 28, 2020

(86) PCT No.: PCT/US2020/034946
§ 371 (c)(1),
(2) Date: Nov. 23, 2021

(87) PCT Pub. No.: WO2020/243321
PCT Pub. Date: Dec. 3, 2020

(65) Prior Publication Data
US 2022/0258085 A1    Aug. 18, 2022

Related U.S. Application Data (60) Provisional application No. 62/853,354, filed on May 28, 2019.

(51) Int. Cl.
*B01D 39/16*    (2006.01)
*B01D 39/08*    (2006.01)
(Continued)

(52) U.S. Cl.
CPC ....... *B01D 39/1692* (2013.01); *B01D 39/083* (2013.01); *B01D 46/0001* (2013.01);
(Continued)

(58) Field of Classification Search
None
See application file for complete search history.

(56) References Cited

U.S. PATENT DOCUMENTS 6,315,130 B1    11/2001   Olsen
7,582,131 B2    9/2009    Worthington et al.
(Continued)

FOREIGN PATENT DOCUMENTS

EP    2913362 A1    9/2015
JP    2004113966 A  4/2004

OTHER PUBLICATIONS

China National Intellectual Property Administration (CNIPA); 1st Office Action; PRC (China) Patent Application No. 202080038588.3; dated Nov. 23, 2022.
(Continued)

*Primary Examiner* — Robert Clemente
(74) *Attorney, Agent, or Firm* — Farber LLC (57) ABSTRACT

The present disclosure provides a polymeric plasticized film or sheet having one or more apertures to reduce the amount of material needed, as well as overall weight, per desired volume of material required. The polymeric plasticized film or sheet may also be capable of folding and keeping the crease for a desired amount of time. The polymeric plasticized film or sheet may be biodegradable.

33 Claims, 8 Drawing Sheets

(51) Int. Cl.
  *B01D 46/00*    (2022.01)
  *B01D 46/52*    (2006.01)
  *C08J 5/18*     (2006.01)
  *C08L 67/04*    (2006.01)

(52) U.S. Cl.
  CPC .............. *B01D 46/521* (2013.01); *C08J 5/18* (2013.01); *C08L 67/04* (2013.01); *B01D 2239/0266* (2013.01); *B01D 2239/0275* (2013.01); *B01D 2239/10* (2013.01); *B01D 2239/1291* (2013.01); *C08J 2367/04* (2013.01); *C08J 2467/02* (2013.01); *C08L 2201/06* (2013.01); *C08L 2203/12* (2013.01); *C08L 2203/16* (2013.01); *C08L 2205/025* (2013.01); *C08L 2205/06* (2013.01)

(56) References Cited

U.S. PATENT DOCUMENTS

| | | |
|---|---|---|
| 2005/0061327 A1 | 3/2005 | Martin et al. |
| 2007/0107393 A1 | 5/2007 | Worthington et al. |
| 2007/0175193 A1* | 8/2007 | Niakan ................ B01D 46/521 |
| | | 55/487 |
| 2008/0070463 A1 | 3/2008 | Arora et al. |
| 2008/0268190 A1* | 10/2008 | Shi .......................... B29C 48/13 |
| | | 428/109 |
| 2015/0337094 A1* | 11/2015 | Wong ...................... C08L 67/04 |
| | | 525/437 |
| 2017/0151527 A1* | 6/2017 | Crum ................... B01D 46/522 |
| 2018/0169550 A1* | 6/2018 | Jaqanathan .......... B01D 39/163 |

OTHER PUBLICATIONS

European Patent Office (EPO); Supplementary Partial EP Search Report and search opinion ; EP Patent Application No. 20815011; dated Mar. 27, 2023.

China National Intellectual Property Administration (CNIPA); 2nd Office Action; PRC (China) Patent Application No. 202080038588.3; dated Jul. 23, 2023.

International Search Report and Written Opinion; PCT/US2020/034946; May 28, 2020.

\* cited by examiner

| | | Total degrees of creep/unfold in 14 days |
|---|---|---|
| 90/10 | MD | 9 |
| | TD | 5 |
| 70/30 | MD | 5 |
| | TD | 9 |
| 60/40 | MD | 12 |
| | TD | 16 |
| 50/50 | MD | 23 |
| | TD | 33 |
| 30/70 | MD | 32 |
| | TD | 36 |

FIG. 2B

*Unfold Test Results for*
*90% PLA : 10% Eco plasticizer*

MD

Day 1

FIG. 3A

Day 14

Day 1

FIG. 3C

Day 14

FIG. 3D

Unfold Test Results for
70% PLA : 30% Eco plasticizer

MD

Day 1

FIG. 4A

Day 14

Day 1

FIG. 4C

Day 14

FIG. 4D

*Unfold Test Results*
*for 60% PLA : 40% Eco plasticizer*

MD

Day 1

*FIG. 5A*

Day 14

Day 1

*FIG. 5C*

Day 14

*FIG. 5D*

Unfold Test Results
for 50% PLA : 50% Eco plasticizer

MD

Day 1

FIG. 6A

Day 14

Day 1

FIG. 6C

Day 14

FIG. 6D

*Unfold Test Results
for 30% PLA : 70% Eco plasticizer*

MD

Day 1

FIG. 7A

Day 14

Day 1

FIG. 7C

Day 14

PLEATED POLYMERIC SHEET HAVING APERTURES

TECHNICAL FIELD

The present disclosure relates to polymer-based films or sheets. More specifically, the present disclosure relates to foldable or pleatable polymeric or plastic sheets containing apertures.

BACKGROUND

The presence of polymeric or plastic films or sheets can be found in virtually all aspects of everyday modern life. From their use as barriers for weeds or mulch in the garden, to roofing and insulation of buildings, to air or liquid filters for heating, ventilation or air conditioning (HVAC) or semi-conductor assembly, these polymeric sheets find applicability in both simple, low technologies as well as complex, high technologies. Because of their relatively low cost and abundant supply, the volume of polymeric material used annually continues to increase. As a result, the amount of used or discarded plastic also continues to build up as harmful waste to our natural ecosystem.

In order to minimize the damage caused to the environment by excessive plastic waste build up, many manufacturers now turn to biodegradable polymers or plastics which can provide the same benefits but would be able to naturally degrade under normal environmental conditions over a certain period of time. Some of the concerns raised with the replacement of conventional, non-biodegradable plastics or polymers with biodegradable plastics or polymers is whether there is sufficient hardness or tensile strength for the intended use, and the ease and cost of manufacture.

To address these concerns, improved biodegradable polymeric or plastic materials are continuously desired. Further, it is desirable to be able to provide polymeric or plastic films or sheets which are able to meet industry needs while also requiring overall less material, and thereby increase efficiency as well as reduce waste.

SUMMARY

The present disclosure addresses the aforementioned concerns by providing a polymeric plasticized film or sheet having one or more apertures to reduce the amount of material needed, as well as overall weight, per desired volume of material required. The polymeric plasticized film or sheet may also be capable of folding and keeping the crease for a desired amount of time. The polymeric plasticized film or sheet may be biodegradable.

According to an exemplary embodiment, a gas filter may be provided having a polymeric sheet as a substrate. The polymeric sheet may comprise at least one polymer, and a material capable of acting as a plasticizer. The sheet may have one or more apertures, and further have at least one crease to form a pleat within the sheet. In addition, the material may have a tensile modulus in the range of about 1.75 to 1.35 GPa when measured in accordance with ASTM E111-97 method for determining Tensile Modulus.

In some embodiments, the sheet has the configuration of a mesh, netting, fabric, knit, or weave. The one or more apertures may be provided as pores or perforations. These pores or perforations may further be diamond shaped.

Further, the sheet may include a plurality of pleats extending across its surface. The pleats may be uniformly spaced across the surface of the sheet, or the pleats may be non-uniformly spaced across the surface of the sheet.

At least one polymer may be a biopolymer and/or a biodegradable polymer. In some embodiments, the at least one polymer may be selected from the group consisting of polymers from biomass, polymers obtained by microbial production, polymers chemically synthesized using monomers obtained from agro-resources, bio-polymers whose monomers and polymers are both obtained by chemical synthesis from fossil resources, polylactic acid (PLA), poly (hydroxyalkanoates) (PHAs), polybutylene adipate terephthalate (PBAT), polybutylene succinate (Bio-PBS), polyvinyl alcohol (PVOH), ethylene vinyl alcohol (EVOH), and polycaprolactone (PCL).

The plasticizer material may also be a biopolymer. In some embodiments, the plasticizer material may be selected from the group consisting of polymers from biomass, polymers obtained by microbial production, polymers chemically synthesized using monomers obtained from agro-resources, bio-polymers whose monomers and polymers are both obtained by chemical synthesis from fossil resources, polyethylene glycol (PEG), polybutylene adipate terephthalate (PBAT), polybutylene succinate (Bio-PBS), polycaprolactone (PCL), and triacetin.

In some embodiments, the ratio of polymer to plasticizer material is in the range of about 95:5 to 55:45. In other embodiments, the ratio of polymer to plasticizer material is in the range of about 90:10 to 60:40. The sheet may have a thickness in the range of about 1 Mil (25.4 µm) to about 40 Mil (1,016 µm), and in some embodiments, may be in the range of about 1 Mil to about 20 Mil (or 25 µm to 508 µm). In some embodiments, an ideal thickness for the material may range from about 1.5 Mil to about 5 Mil (or 38.1 µm to 127 µm).

A method of manufacturing the polymeric sheet of the gas filter is also provided. The method may comprise providing at least one polymer, the polymer being biodegradable, providing a material capable of acting as a plasticizer, the plasticizer being biodegradable, forming a sheet of polymeric plasticized material from the at least one polymer and plasticizer, the sheet containing one or more apertures, and forming at least one pleat in the sheet by creasing the sheet without the addition of heat.

In some embodiments, the sheet of polymeric plasticized material may be formed as a mesh, netting, fabric, knit, or weave. For example, the sheet of polymeric plasticized material may be formed as a mesh, and the apertures may comprise diamond shaped openings.

In some embodiments, a plurality of pleats may be formed uniformly spaced apart across the surface of the sheet. In other embodiments, a plurality of pleats may be formed non-uniformly spaced apart across the surface of the sheet.

In accordance with another exemplary embodiment, a polymeric sheet is provided. The polymeric sheet may comprise at least one polymer, and a material capable of acting as a plasticizer, the sheet having one or more apertures for flow of gas or liquid therethrough, and further being capable of forming at least one pleat in the sheet by creasing the sheet without the addition of heat. The material may have a tensile modulus in the range of about 1.75 to 1.35 GPa when measured in accordance with ASTM E111-97 method for determining Tensile Modulus. The ratio of polymer to plasticizer material of the sheet may range from about 95:5 to about 55:45, and in some embodiments, may range from about 90:10 to 60:40.

It is to be understood that both the foregoing general description and the following detailed description are exemplary and explanatory only and are not restrictive of the disclosure. Additional features of the disclosure will be set forth in part in the description which follows or may be learned by practice of the disclosure.

BRIEF DESCRIPTION OF THE DRAWINGS

The accompanying drawings, which are incorporated in and constitute a part of this specification, illustrate several embodiments of the disclosure and together with the description, serve to explain the principles of the disclosure.

DESCRIPTION OF THE EMBODIMENTS

This description and the accompanying drawings illustrate exemplary embodiments and should not be taken as limiting, with the claims defining the scope of the present disclosure, including equivalents. Various mechanical, compositional, structural, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment. Moreover, the depictions herein are for illustrative purposes only and do not necessarily reflect the actual shape, size, or dimensions of the system or illustrated components.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

The present disclosure provides a polymeric plasticized film or sheet having one or more apertures to reduce the amount of material needed, as well as overall weight, per desired volume of material required. Additionally, the polymeric plasticized film or sheet may also be capable of folding and keeping the crease for a desired amount of time. The polymeric plasticized material which forms the film or sheet of the present disclosure may comprise at least one polymer, and a material capable of acting as a plasticizer with the at least one polymer. The polymeric plasticized film may be biodegradable.

In one embodiment, at least one of the polymers may be a biopolymer, or bio-based polymer. By biopolymer or bio-based polymer, what is meant is that the polymer breaks down under standard conditions within a certain timeframe. Suitable materials for the biopolymer or bio-based polymer may include: polymers from biomass, polymers obtained by microbial production, polymers chemically synthesized using monomers obtained from agro-resources, bio-polymers whose monomers and polymers are both obtained by chemical synthesis from fossil resources, polylactic acid (PLA), poly(hydroxyalkanoates) (PHAs), polybutylene adipate terephthalate (PBAT), polybutylene succinate (Bio-PBS), polyvinyl alcohol (PVOH), ethylene vinyl alcohol (EVOH), polycaprolactone (PCL), and the like, for example.

The material capable of acting as a plasticizer may also be a biopolymer, or bio-based polymer, and may be a bio-plasticizer. Suitable materials for the plasticizer may include: polymers from biomass, polymers obtained by microbial production, polymers chemically synthesized using monomers obtained from agro-resources, bio-polymers whose monomers and polymers are both obtained by chemical synthesis from fossil resources, polyethylene glycol (PEG), polybutylene adipate terephthalate (PBAT), polybutylene succinate (Bio-PBS), polycaprolactone (PCL), triacetin, and the like, for example.

As previously discussed, it is desirable to provide a polymer plasticized film or sheet that may be porous or perforated, in order to reduce the mass and weight needed for a desired volume of material. For example, in one embodiment, the film or sheet of polymer plasticized material may be provided in the form a netting, mesh, weave, knit, fabric, or other construct having one or more apertures or openings like pores or perforations. These pores or perforations may have a defined geometric shape, such as for example, a diamond, square, rhombus, circle, oval, or other similar configuration. Of course, it is understood that the pores or perforations may also have irregular geometric shapes as well. In some embodiments, the pores or perforations may be punched or cut out of the film or sheet of polymer plasticized material. For instance, elongate, X-, V- or C-shaped slits may be cut into the film or sheet such that, when the film or sheet is stretched or expanded, or rolled over itself, the slits expand to form the openings, pores or perforations.

Furthermore, as mentioned earlier, it is also desirable to be able to provide this polymer plasticized film or sheet having one or more apertures with folds. By folds, what is meant is that the film or sheet may be pleated, crimped, ridged, fluted, channeled, furrowed, grooved, crinkled, puckered, creased, crumpled, or otherwise corrugated in such a way as to have rows of folds. These rows of folds may be formed as a series of waves. The folds or pleats may be uniformly spaced across the film or sheet of polymer plasticized material, or they may be non-uniformly spaced across the film or sheet of polymer plasticized material.

the degree of unfolding that occurred with each sample between day 1 to day 14, by the difference in the angle as measured by the protractor, under normal (i.e., ambient or room temperature) conditions. The table below summarizes the results.

TABLE 1

Pleat Fold-Unfold Test for Sample 1 Pleated Layer

Figure 2A:
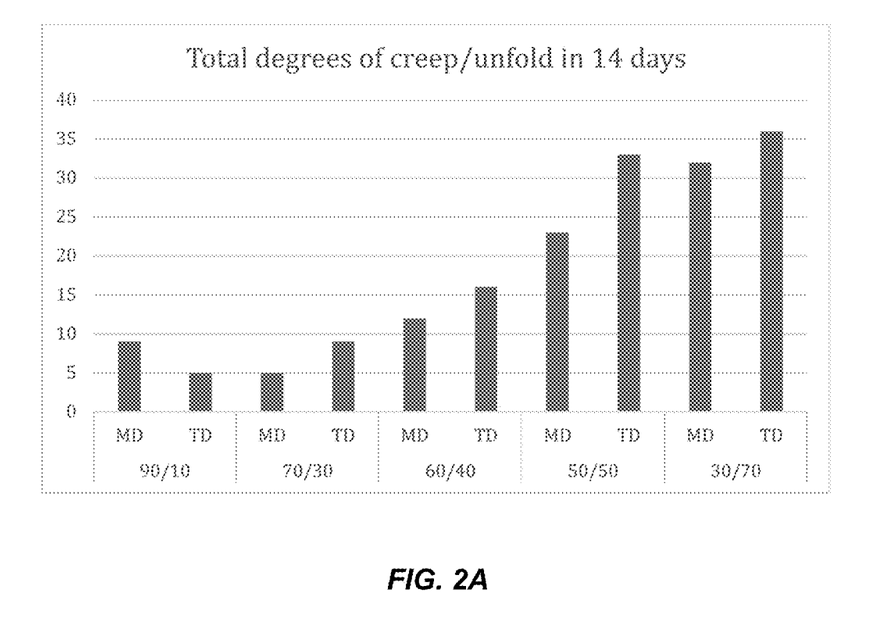
FIGS. 2A and 2B are graphical representations in bar graph format and table format of degree of unfold or creep of the various samples of the polymer plasticized materials in FIG. 1.
Figure 2B:
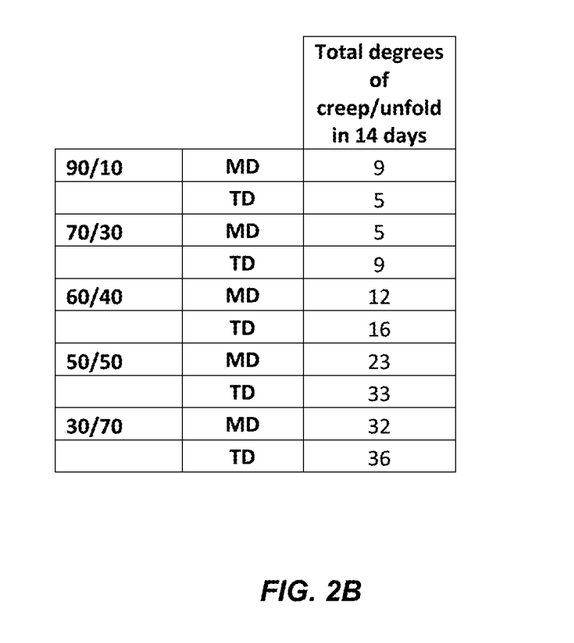
Figure 3A:
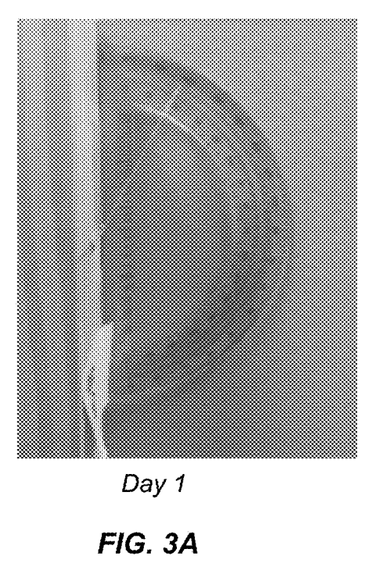
FIGS. 3A to 3D represent photographic results from a fold test of a polymeric plasticized sheet comprising 90% PLA to 10% Eco plasticizer on day 1 and 14, in a machine direction (MD) as well as a transverse direction (MD), as labeled.
Figure 3B:
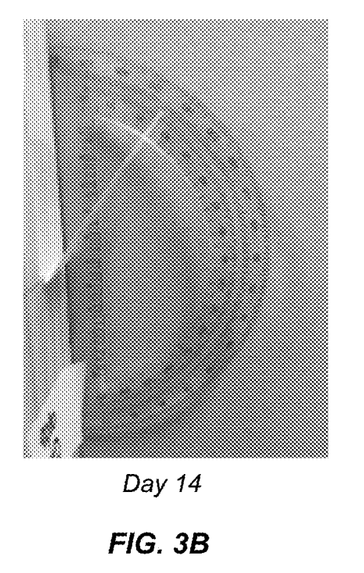
Figure 3C:
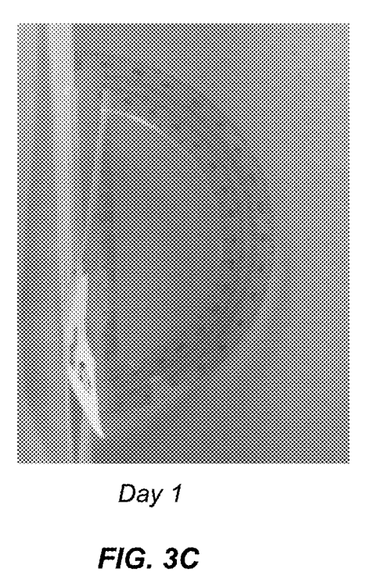
Figure 3D:
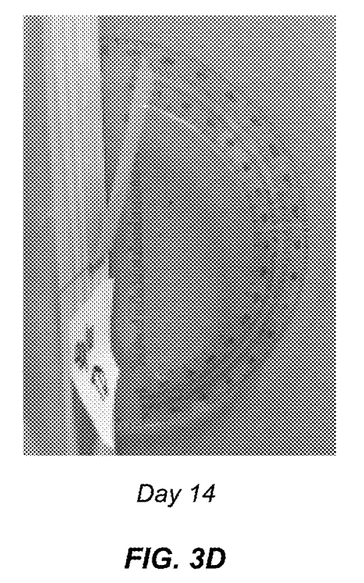
Figure 4A:
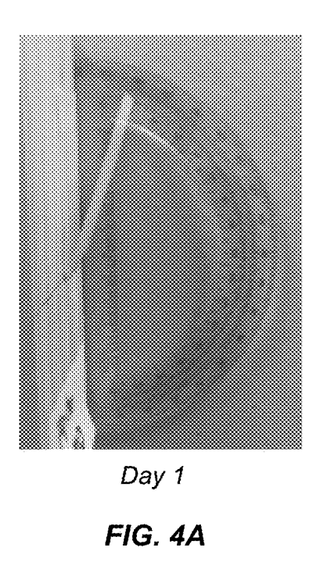
FIGS. 4A to 4D represent photographic results from a fold test of a polymeric plasticized sheet comprising 70% PLA to 30% Eco plasticizer on day 1 and 14, in a machine direction (MD) as well as a transverse direction (TD), as labeled.
Figure 4B:
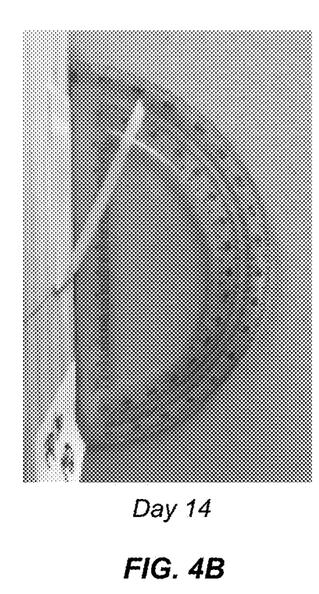
Figure 4C:
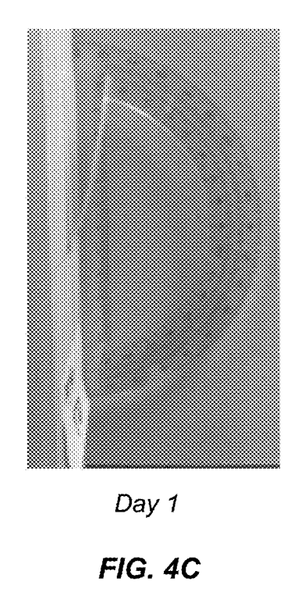
Figure 4D:
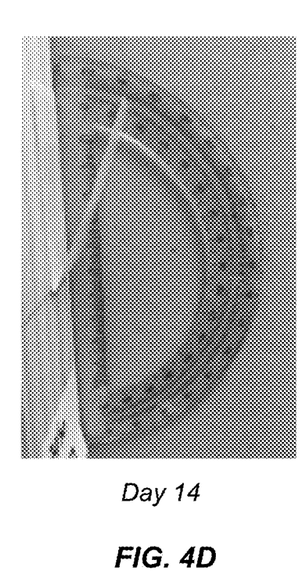
Figure 5A:
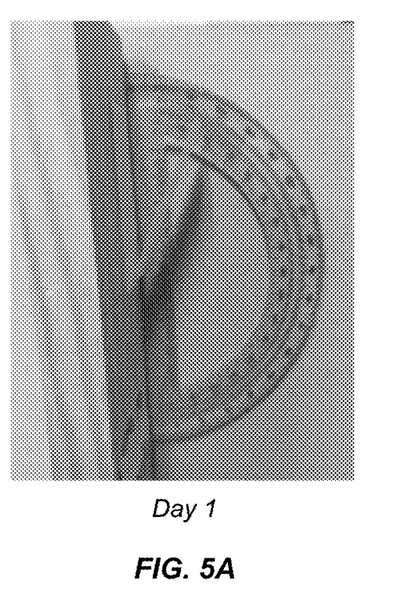
FIGS. 5A to 5D represent photographic results from a fold test of a polymeric plasticized sheet comprising 60% PLA to 40% Eco plasticizer on day 1 and 14, in a machine direction (MD) as well as a transverse direction (TD), as labeled.
Figure 5B:
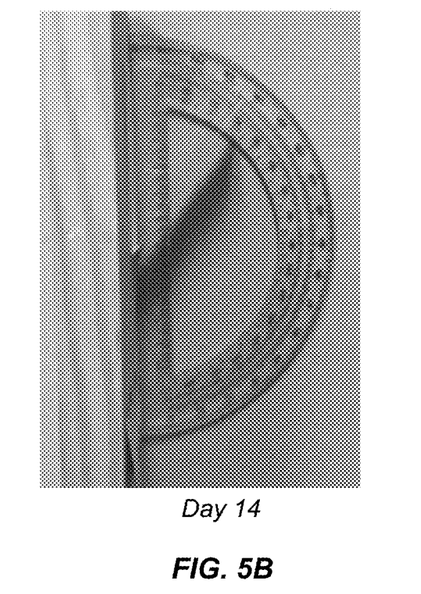
Figure 5C:
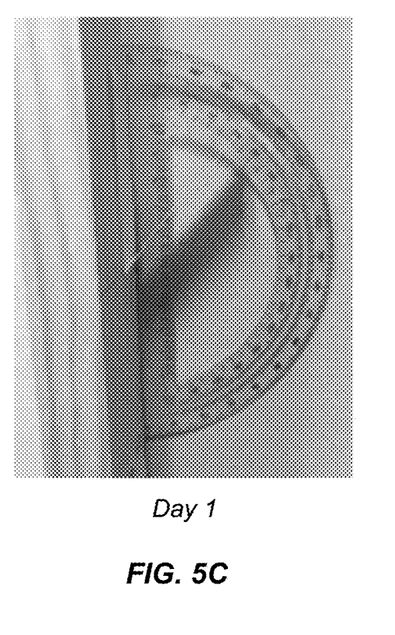
Figure 5D:
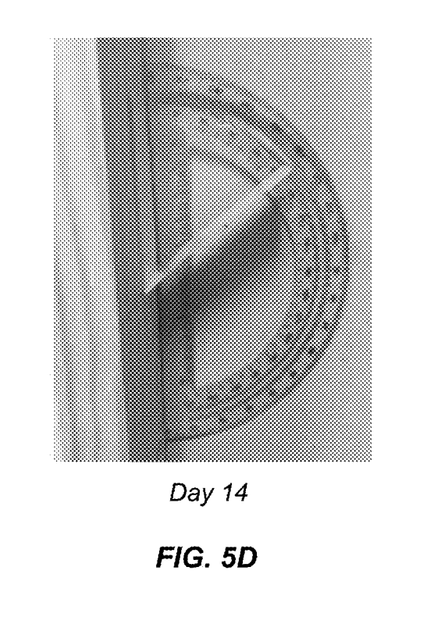
Figure 6A:
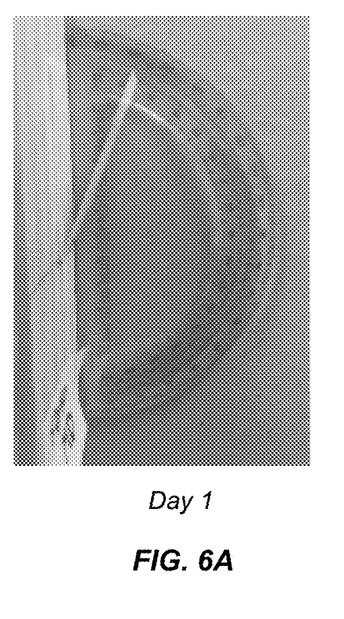
FIGS. 6A to 6D represent photographic results from a fold test of a polymeric plasticized sheet comprising 50% PLA to 50% Eco plasticizer on day 1 and 14, in a machine direction (MD) as well as a transverse direction (TD), as labeled.
Figure 6B:
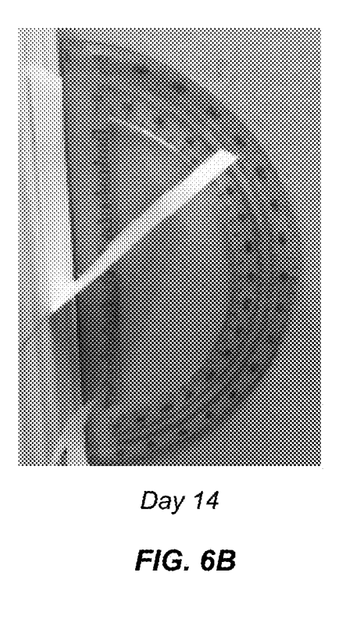
Figure 6C:
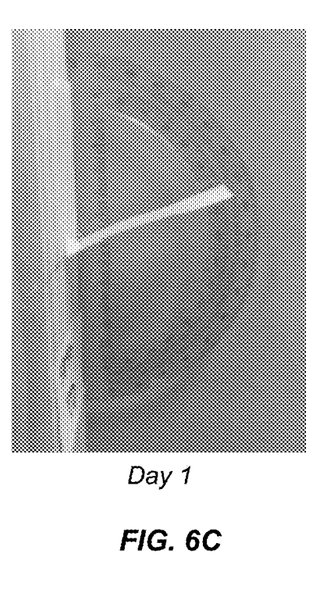
Figure 6D:
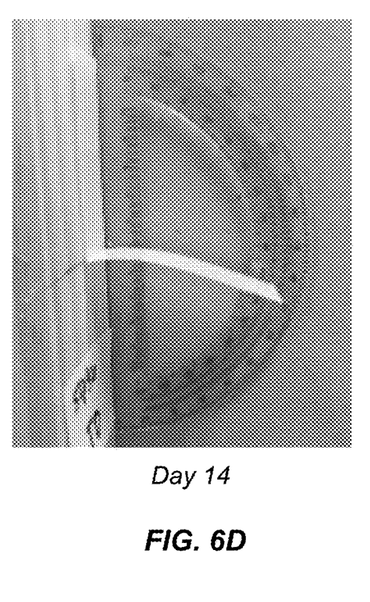
Figure 7A:
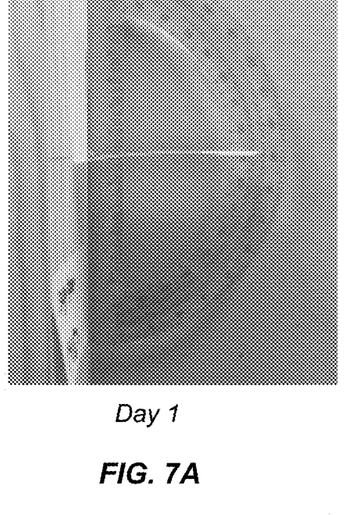
FIGS. 7A to 7D represent photographic results from a fold test of a polymeric plasticized sheet comprising 30% PLA to 70% Eco plasticizer on day 1 and 14, in a machine direction (MD) as well as a transverse direction (TD), as labeled.
Figure 7B:
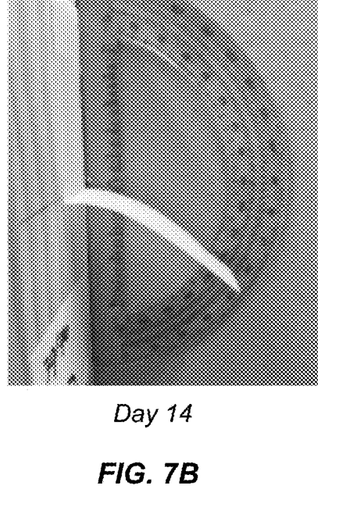
Figure 7C:
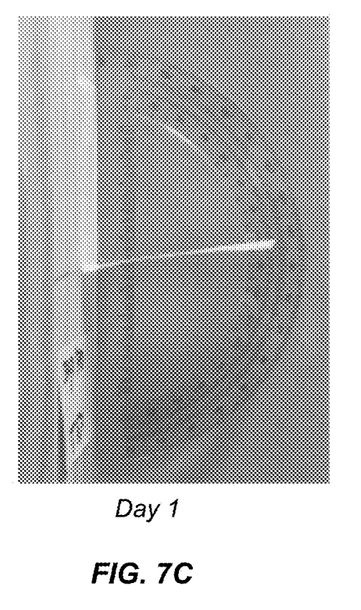
Figure 7D:
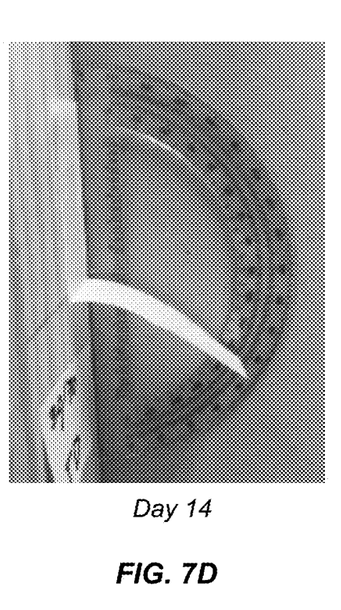

| Sample 1 Polymer 1:Polymer 2 (plasticizer) | | Time Zero | 2 Hours | 18 Hours | 24 Hours | 2 Days | 3 Days | 4 Days | 7 Days | 8 Days | 14 Days | Total degrees of creep/unfold in 14 days |
|---|---|---|---|---|---|---|---|---|---|---|---|---|
| 90/10 | MD | 27 | 30 | 30 | 33 | 33 | 33 | 34 | 35 | 35 | 36 | 9 |
|  | TD | 13 | 14 | 15 | 15 | 16 | 16 | 17 | 17 | 17 | 18 | 5 |
| 70/30 | MD | 20 | 20 | 22 | 23 | 23 | 24 | 24 | 24 | 24 | 25 | 5 |
|  | TD | 15 | 17 | 18 | 19 | 21 | 22 | 23 | 23 | 23 | 24 | 9 |
| 60/40 | MD | 25 | 32 | 33 | 34 | 36 | 36 | 36 | 36 | 36 | 37 | 12 |
|  | TD | 33 | 42 | 44 | 46 | 47 | 47 | 47 | 48 | 48 | 49 | 16 |
| 50/50 | MD | 25 | 36 | 41 | 42 | 44 | 45 | 45 | 47 | 47 | 48 | 23 |
|  | TD | 70 | 85 | 90 | 93 | 96 | 98 | 100 | 101 | 101 | 103 | 33 |
| 30/70 | MD | 90 | 100 | 109 | 110 | 115 | 116 | 117 | 120 | 120 | 122 | 32 |
|  | TD | 85 | 95 | 105 | 109 | 113 | 115 | 116 | 120 | 120 | 121 | 36 |

Of relevance, it is desirable to be able to fold or pleat the film or sheet under ambient temperature conditions, without the requirement for additional heat. This type of cold pleating is particularly beneficial from a manufacturing perspective because the pleating or folding process of the film or sheet can be done at through-put speed, without the need to hold the film or sheet a certain amount of time under heat, in order to achieve the desired amount and level of folds or pleats. In addition, the integrity of the materials may be ensured since no concern of degradation due to the application of heat is involved.

EXAMPLES

In order to determine a suitable biodegradable polymer plasticized material that could achieve the desired results of the present disclosure, various materials of differing polymer to plasticizer ratios were tested for strength (tensile modulus in GPa) as well as for its ability to hold a fold or pleat for a certain period of time. The results are provided below.

Figure 1:
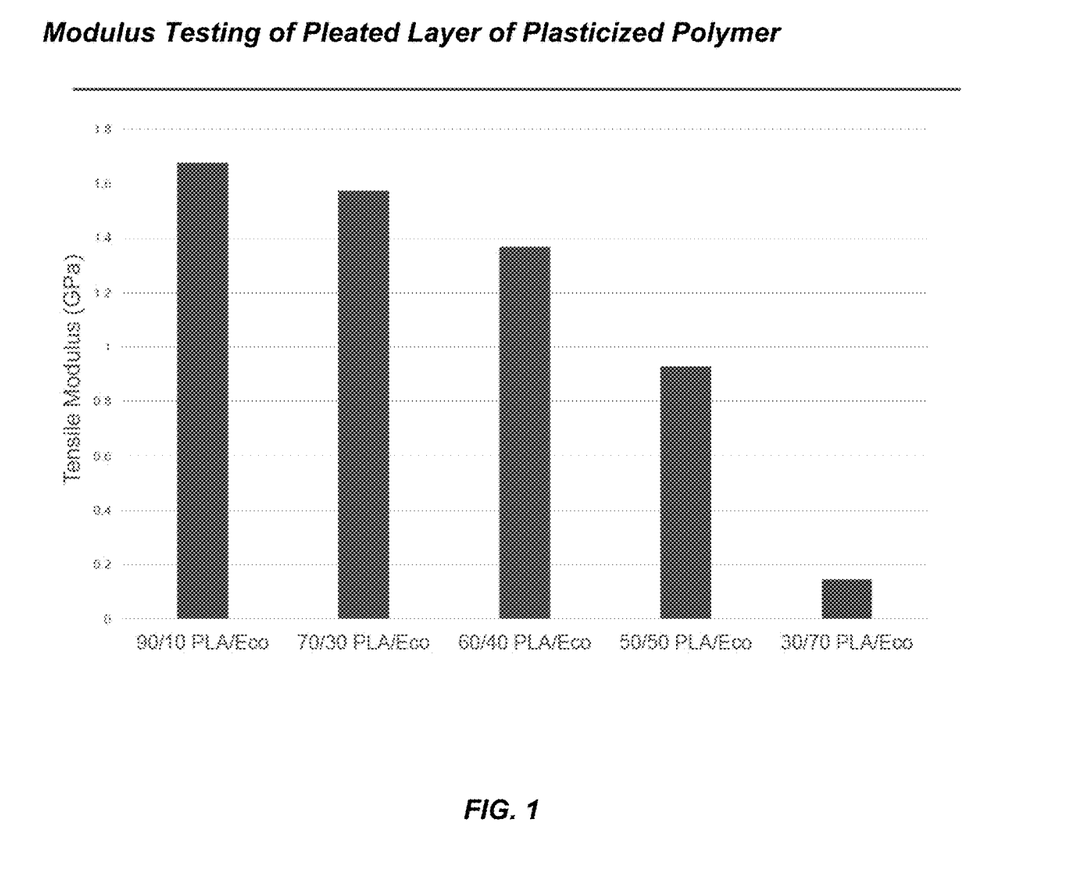
FIG. 1 represents a bar graph of various polymer plasticized materials (in varying ratio of polymer to plasticizer) and tensile modulus values.

FIG. 1 represents a bar graph of various polymer plasticized materials (in varying ratios of polymer to plasticizer) and tensile modulus values. The polymer plasticized materials had varying ratios of polymer (PLA) to plasticizer (in this case, polybutylene adipate terephthalate or PBAT) and were pleated. It was found that suitable materials have a ratio of about 95:5 to 55:45 or about 90:10 to about 60:40. Tensile modulus testing was based on ASTM E111-97 method. As shown, tensile modulus (GPa) can be in the range of about 1.75 to about 1.35 for suitable materials with the appropriate ratio of polymer to plasticizer.

Unfold Testing

FIGS. 2A and 2B are graphical representations in bar graph format and table format of degree of unfold or creep of the various samples of the polymer plasticized materials in FIG. 1. These values were obtained from time zero up through days 1 to 14. In addition, FIGS. 3A to 7D are photographs of various pleated polymeric plasticized sheets which have been folded and tested over time to determine how well the folds or creases remained. The test measures FIGS. 3A to 3D illustrate photographic results from a fold test of a polymeric plasticized sheet comprising 90% PLA to 10% Eco plasticizer on day 1 and 14, in a machine direction (MD) as well as a transverse direction (MD), as labeled. FIGS. 4A to 4D illustrate photographic results from a fold test of a polymeric plasticized sheet comprising 70% PLA to 30% Eco plasticizer on day 1 and 14, in a machine direction (MD) as well as a transverse direction (TD), as labeled. FIGS. 5A to 5D illustrate photographic results from a fold test of a polymeric plasticized sheet comprising 60% PLA to 40% Eco plasticizer on day 1 and 14, in a machine direction (MD) as well as a transverse direction (TD), as labeled. FIGS. 6A to 6D illustrate photographic results from a fold test of a polymeric plasticized sheet comprising 50% PLA to 50% Eco plasticizer on day 1 and 14, in a machine direction (MD) as well as a transverse direction (TD), as labeled. FIGS. 7A to 7D illustrate photographic results from a fold test of a polymeric plasticized sheet comprising 30% PLA to 70% Eco plasticizer on day 1 and 14, in a machine direction (MD) as well as a transverse direction (TD), as labeled.

What has been determined is that suitable ratios appear to be somewhere between 95:5 and 55:45, or 90:10 and 60:40. These polymer plasticized materials provided the adequate tensile strength (i.e., in the range of about 1.75 to 1.35 GPa when measured in accordance with ASTM D882 method for determining Tensile Strength) as well as ability to hold the pleat or fold such that the sheet can be crumpled, folded, wound, rolled, or otherwise compressed, into a desired volume for certain applications.

TABLE 2

Material Thicknesses

| Sample | Material Thickness | |
|---|---|---|
| # | (µm) | Mil |
| 1 | 38.1 | 1.5 |
| 2 | 50.8 | 2 |
| 3 | 127 | 5 |
| 4 | 254 | 10 |
| 5 | 381 | 15 |

TABLE 2-continued

Material Thicknesses

| Sample # | Material Thickness (μm) | Mil |
|---|---|---|
| 6 | 431.8 | 17 |
| 7 | 508 | 20 |

Table 2 above represents the material thicknesses of various samples of polymeric plasticized films or sheets of the present disclosure. It is contemplated that the material's thickness may vary from about 1 Mil (25.4 μm) to about 40 Mil (1,016 μm), and as shown in the table above, may be in the range of about 1 Mil to about 20 Mil (or 25 μm to 508 μm). In some embodiments, an ideal thickness for the material may range from about 1.5 Mil to about 5 Mil (or 38.1 μm to 127 μm).

Pleated, porous or perforated polymeric plasticized films or sheets may be used in a variety of different applications. The films or sheets may be laminated to other materials or substrates, and serve in a structural supportive capacity. The films or sheets may be a substitute for metal supports, such as metal netting or meshes, for example.

Figure 8:
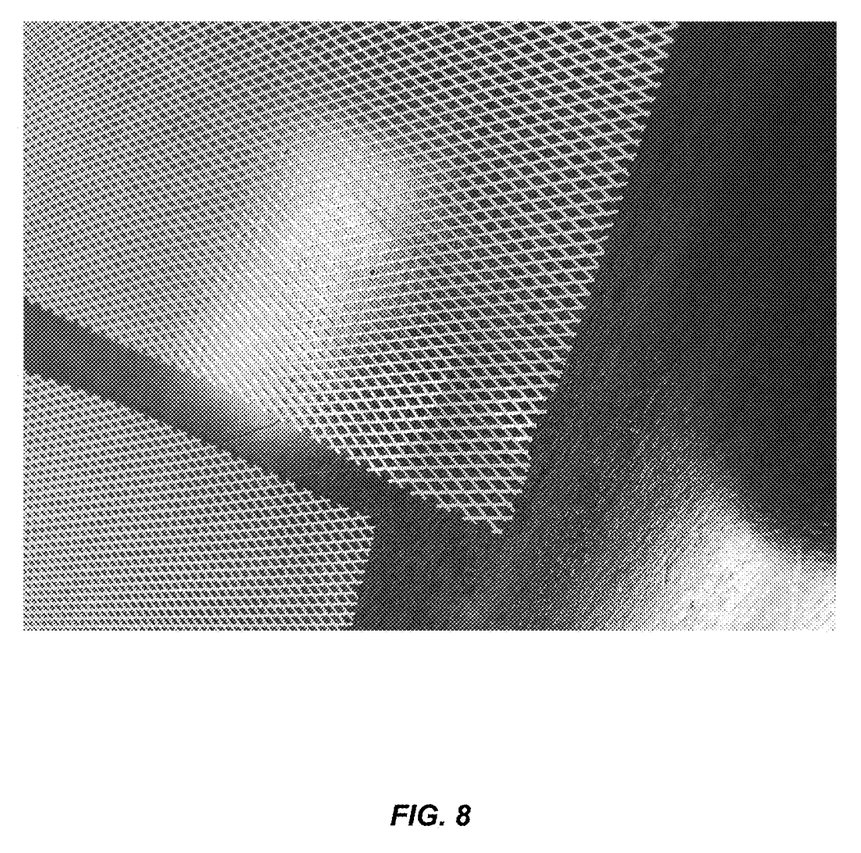
FIG. 8 represents photographic images of exemplary polymeric plasticized sheets of the present disclosure, having differently sized apertures.

The film or sheet of polymer plasticized material may include pores, as shown. The porosity of the material may be in the range of about 40% to about 95%. In some embodiments, the film or sheet may comprise a mesh, and the pores may be shaped like diamonds, squares, or rhombuses. For instance, the mesh may be a net comprising a first set of substantially parallel filaments crossed with a second set of substantially parallel filaments to form a plurality of parallelograms having angles of 90 degrees, or a range of angles from 40 to 115 degrees, to form diamond-shaped pores. As shown in FIG. 8, the film or sheet of polymer plasticized material may have diamond-shaped apertures or openings which define the open space between strands or individual filaments of the mesh or netting. The film or sheet of mesh may have a thickness in the range of about 1 Mil (25.4 μm) to about 40 Mil (1,016 μm), and in some embodiments, may be in the range of about 1 Mil to about 20 Mil (or 25 μm to 508 μm). In some embodiments, an ideal thickness for the material may range from about 1.5 Mil to about 5 Mil (or 38.1 μm to 127 μm). Two embodiments of films or sheets of varying thicknesses and corresponding aperture sizes are depicted in the photographs of FIG. 8.

Other embodiments will be apparent to those skilled in the art from consideration of the specification and practice of the embodiment disclosed herein. It is intended that the specification and examples be considered as exemplary only, with a true scope and spirit of the embodiment being indicated by the following claims.

What is claimed is:

1. A gas filter, comprising:
    a pleated netting formed of at least one polymer and a plasticizer, the ratio of polymer to plasticizer ranging from 95:5 to 55:45 by weight;
    the pleated netting having one or more diamond shaped apertures for flow of gas therethrough, and further having at least one crease to form a pleat extending across a surface of the pleated netting, and
    wherein the pleated netting has a tensile modulus in the range of 1.75 to 1.35 GPa when measured in accordance with ASTM E111-97 method for determining Tensile Modulus.

2. The gas filter of claim 1, wherein the one or more apertures comprise pores or perforations.
3. The gas filter of claim 1, further including a plurality of pleats extending across its surface.
4. The gas filter of claim 3, wherein the pleats are uniformly spaced across the surface of the netting.
5. The gas filter of claim 3, wherein the pleats are non-uniformly spaced across the surface of the netting.
6. The gas filter of claim 1, wherein the at least one polymer is a biopolymer.
7. The gas filter of claim 1, wherein the at least one polymer is a biodegradable polymer.
8. The gas filter of claim 1, wherein the at least one polymer is selected from the group consisting of polymers from biomass, polymers obtained by microbial production, polymers chemically synthesized using monomers obtained from agro-resources, bio-polymers whose monomers and polymers are both obtained by chemical synthesis from fossil resources, polylactic acid (PLA), poly(hydroxyalkanoates) (PHAs), polybutylene adipate terephthalate (PBAT), polybutylene succinate (Bio-PBS), polyvinyl alcohol (PVOH), ethylene vinyl alcohol (EVOH), and polycaprolactone (PCL).
9. The gas filter of claim 1, wherein the plasticizer material is a biopolymer.
10. The gas filter of claim 1, wherein the plasticizer material is selected from the group consisting of polymers from biomass, polymers obtained by microbial production, polymers chemically synthesized using monomers obtained from agro-resources, bio-polymers whose monomers and polymers are both obtained by chemical synthesis from fossil resources, polyethylene glycol (PEG), polybutylene adipate terephthalate (PBAT), polybutylene succinate (Bio-PBS), polycaprolactone (PCL), and triacetin.
11. The gas filter of claim 1, wherein the ratio of polymer to plasticizer material is in the range of 90:10 to 60:40 by weight.
12. The gas filter of claim 1, wherein the pleated netting further has a thickness in the range of 25 μm to 1.016 μm.
13. A method of manufacturing the gas filter of claim 1, comprising:
    providing at least one polymer, the polymer being biodegradable;
    providing a plasticizer, the plasticizer being biodegradable;
    forming a netting of polymeric plasticized material from the at least one polymer and plasticizer, the ratio of polymer to plasticizer ranging from 95:5 to 55:45 by weight;
    providing the netting with one or more diamond shaped apertures; and
    forming at least one pleat across a surface of the netting by cold pleating the netting without the addition of heat.
14. The method of claim 13, wherein the at least one polymer is selected from the group consisting of polymers from biomass, polymers obtained by microbial production, polymers chemically synthesized using monomers obtained from agro-resources, bio-polymers whose monomers and polymers are both obtained by chemical synthesis from fossil resources, polylactic acid (PLA), poly(hydroxyalkanoates) (PHAs), polybutylene adipate terephthalate (PBAT), polybutylene succinate (Bio-PBS), polyvinyl alcohol (PVOH), ethylene vinyl alcohol (EVOH), and polycaprolactone (PCL).
15. The method of claim 13, wherein the plasticizer material is selected from the group consisting of polymers from biomass, polymers obtained by microbial production, polymers chemically synthesized using monomers obtained from agro-resources, bio-polymers whose monomers and polymers are both obtained by chemical synthesis from fossil resources, polyethylene glycol (PEG), polybutylene adipate terephthalate (PBAT), polybutylene succinate (Bio-PBS), polycaprolactone (PCL), and triacetin.

16. The method of claim 13, wherein the ratio of polymer to plasticizer material is in the range of 90:10 to 60:40 by weight.

17. The method of claim 13, wherein a plurality of pleats are formed uniformly spaced apart across the surface of the netting.

18. The method of claim 13, wherein a plurality of pleats are formed non-uniformly spaced apart across the surface of the netting.

19. A pleated polymeric netting, comprising:
at least one polymer and a plasticizer, the pleated polymeric netting having one or more diamond shaped apertures for flow of gas or liquid therethrough, and further having at least one pleat extending across a surface of the pleated polymeric netting;
wherein the pleated polymeric netting has a tensile modulus in the range of 1.75 to 1.35 GPa when measured in accordance with ASTM E111-97 method for determining Tensile Modulus.

20. The netting of claim 19, wherein the ratio of polymer to plasticizer material ranges from 95:5 to 55:45 by weight.

21. The netting of claim 19, wherein the ratio of polymer to plasticizer material is in the range of 90:10 to 60:40 by weight.

22. The netting of claim 19, wherein the one or more apertures comprise pores or perforations.

23. The netting of claim 19, further including a plurality of pleats extending across its surface.

24. The netting of claim 23, wherein the pleats are uniformly spaced across the surface of the netting.

25. The netting of claim 23, wherein the pleats are non-uniformly spaced across the surface of the netting.

26. The netting of claim 19, wherein the at least one polymer is a biopolymer.

27. The netting of claim 19, wherein the at least one polymer is a biodegradable polymer.

28. The netting of claim 19, wherein the at least one polymer is selected from the group consisting of polymers from biomass, polymers obtained by microbial production, polymers chemically synthesized using monomers obtained from agro-resources, bio-polymers whose monomers and polymers are both obtained by chemical synthesis from fossil resources, polylactic acid (PLA), poly(hydroxyalkanoates) (PHAs), polybutylene adipate terephthalate (PBAT), polybutylene succinate (Bio-PBS), polyvinyl alcohol (PVOH), ethylene vinyl alcohol (EVOH), and polycaprolactone (PCL).

29. The netting of claim 19, wherein the plasticizer material is a biopolymer.

30. The netting of claim 19, wherein the plasticizer material is selected from the group consisting of polymers from biomass, polymers obtained by microbial production, polymers chemically synthesized using monomers obtained from agro-resources, bio-polymers whose monomers and polymers are both obtained by chemical synthesis from fossil resources, polyethylene glycol (PEG), polybutylene adipate terephthalate (PBAT), polybutylene succinate (Bio-PBS), polycaprolactone (PCL), and triacetin.

31. The netting of claim 19, further having a thickness in the range of 25 µm to 1.016 µm.

32. The netting of claim 31, wherein the thickness is in the range of 25 µm to 508 µm.

33. The netting of claim 31, wherein the thickness is in the range of 38 µm to 127 µm.

\* \* \* \* \*